US011315737B2

(12) United States Patent
Hirao et al.

(10) Patent No.: US 11,315,737 B2
(45) Date of Patent: Apr. 26, 2022

(54) MULTILAYER CERAMIC CAPACITOR

(71) Applicant: Murata Manufacturing Co., Ltd., Nagaokakyo (JP)

(72) Inventors: Takahiro Hirao, Nagaokakyo (JP); Fumio Naruse, Nagaokakyo (JP); Tomohiro Kageyama, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

(21) Appl. No.: 17/158,073

(22) Filed: Jan. 26, 2021

(65) Prior Publication Data

US 2021/0249193 A1 Aug. 12, 2021

(30) Foreign Application Priority Data

Feb. 7, 2020 (JP) .............................. JP2020-019406

(51) Int. Cl.
*H01G 4/30* (2006.01)
*H01G 4/012* (2006.01)
*H01G 2/02* (2006.01)
*H01G 4/008* (2006.01)
*H01G 4/12* (2006.01)

(52) U.S. Cl.
CPC ................ *H01G 4/30* (2013.01); *H01G 2/02* (2013.01); *H01G 4/008* (2013.01); *H01G 4/012* (2013.01); *H01G 4/1218* (2013.01)

(58) Field of Classification Search
CPC ............ H01G 4/12; H01G 2/06; H01G 2/065; H01G 4/005; H01G 4/012; H01G 4/232; H01G 4/30; H01G 4/38; H01G 4/248; H01G 4/02; H01G 4/008; H01G 4/1218
See application file for complete search history.

(56) References Cited

U.S. PATENT DOCUMENTS 7,688,568 B1\* 3/2010 Lee .................... H01G 4/385
361/321.1
2003/0030510 A1\* 2/2003 Sasaki .................. H05K 3/3442
333/185

(Continued)

FOREIGN PATENT DOCUMENTS

JP 2004-193352 A 7/2004

*Primary Examiner* — Michael P McFadden
(74) *Attorney, Agent, or Firm* — Keating & Bennett, LLP

(57) ABSTRACT

A multilayer ceramic capacitor includes a multilayer body and outer electrodes. The multilayer body includes first and second multilayer ceramic structures and an intermediate body between the first and second multilayer ceramic structures, first to fourth connection electrodes electrically connecting first inner electrodes, second inner electrodes, third inner electrodes, and fourth inner electrodes, respectively, a first connection wire electrically connecting the first connection electrode and one of the third connection electrode and the fourth connection electrode, and a second connection wire electrically connecting the second connection electrode and the other connection electrode. A current route from the first connection electrode via the first connection wire to the one connection electrode and a current route from the second connection electrode via the second connection wire to the other connection electrode have different lengths.

19 Claims, 9 Drawing Sheets

(56) References Cited

U.S. PATENT DOCUMENTS

| | | | |
|---|---|---|---|
| 2015/0014036 A1* | 1/2015 | Park | H01G 4/232 |
| | | | 361/301.4 |
| 2015/0041202 A1* | 2/2015 | Ahn | H01F 27/40 |
| | | | 361/270 |
| 2015/0116966 A1* | 4/2015 | Lee | H01G 4/30 |
| | | | 361/767 |
| 2015/0146343 A1* | 5/2015 | Ellmore | H01G 2/103 |
| | | | 361/301.4 |
| 2018/0012706 A1* | 1/2018 | Bultitude | H01G 4/012 |

* cited by examiner

MULTILAYER CERAMIC CAPACITOR

CROSS REFERENCE TO RELATED APPLICATIONS

This application claims the benefit of priority to Japanese Patent Application No. 2020-019406 filed on Feb. 7, 2020. The entire contents of this application are hereby incorporated herein by reference.

BACKGROUND OF THE INVENTION

1. Field of the Invention

The present invention relates to multilayer ceramic capacitors.

2. Description of the Related Art

A multilayer ceramic capacitor has been known, which includes a ceramic multilayer body including a plurality of dielectric layers and a plurality of inner electrodes alternately laminated and an outer electrode provided on a surface of the ceramic multilayer body. When this multilayer ceramic capacitor is mounted on a substrate, the substrate vibrates by distortion occurring when alternating voltage is applied to the multilayer ceramic capacitor, and sounds called "acoustic noise" may be produced.

Japanese Unexamined Patent Application Publication No. 2004-193352 describes a multilayer ceramic capacitor configured to have two or more capacitor portions that are provided in the chip and spaced in the length direction in order to inhibit the above-described acoustic noise, with a portion including only a dielectric material surrounding each capacitor portion at both end portions in the length direction and both end portions in the height direction of the chip and with a portion including only a dielectric material between the capacitor portions.

However, the multilayer ceramic capacitor described in Japanese Unexamined Patent Application Publication No. 2004-193352 is configured to have the plurality of capacitor portions with the same structure provided in the length direction, and therefore, the effect of inhibiting acoustic noise is not sufficient.

SUMMARY OF THE INVENTION

Preferred embodiments of the present invention provide multilayer ceramic capacitors that are each capable of reducing or preventing acoustic noise when voltage is applied.

A multilayer ceramic capacitor according to a first preferred embodiment of the present invention includes a multilayer body including a plurality of laminated dielectric layers and a plurality of inner electrodes and including a first main surface and a second main surface opposed to each other in a laminating direction of the dielectric layers and the inner electrodes, a first side surface and a second side surface opposed to each other in a width direction orthogonal or substantially orthogonal to the laminating direction, and a first end surface and a second end surface opposed to each other in a length direction orthogonal or substantially orthogonal to the laminating direction and the width direction; and an outer electrode electrically connected to the inner electrodes and provided on a surface of the multilayer body. The multilayer body includes a first multilayer ceramic structure including a plurality of laminated first dielectric layers, a plurality of first inner electrodes, and a plurality of second inner electrodes; a second multilayer ceramic structure including a plurality of laminated second dielectric layers, a plurality of third inner electrodes, and a plurality of fourth inner electrodes; an intermediate body between the first multilayer ceramic structure and the second multilayer ceramic structure in the laminating direction and not including the inner electrodes; a first connection electrode electrically connecting the plurality of first inner electrodes; a second connection electrode electrically connecting the plurality of second inner electrodes; a third connection electrode electrically connecting the plurality of third inner electrodes; a fourth connection electrode electrically connecting the plurality of fourth inner electrodes; a first connection wire electrically connecting the first connection electrode and one of the third connection electrode and the fourth connection electrode; and a second connection wire electrically connecting the second connection electrode and another one of the third connection electrode and the fourth connection electrode. One of the first multilayer ceramic structure and the second multilayer ceramic structure includes the outer electrode and the inner electrodes not connected via the first connection wire and the second connection wire, and another one of the first multilayer ceramic structure and the second multilayer ceramic structure includes the outer electrode and the inner electrodes electrically connected via the first connection wire and the second connection wire. A current route from the first connection electrode via the first connection wire to the one of the third connection electrode and the fourth connection electrode and a current route from the second connection electrode via the second connection wire to the another of the third connection electrode and the fourth connection electrode have different lengths.

A multilayer ceramic capacitor according to a second preferred embodiment of the present invention includes a multilayer body including a plurality of laminated dielectric layers and a plurality of inner electrodes and including a first main surface and a second main surface opposed to each other in a laminating direction of the dielectric layers and the inner electrodes, a first side surface and a second side surface opposed to each other in a width direction orthogonal or substantially orthogonal to the laminating direction, and a first end surface and a second end surface opposed to each other in a length direction orthogonal or substantially orthogonal to the laminating direction and the width direction; and an outer electrode electrically connected to the inner electrodes and provided on a surface of the multilayer body. The multilayer body includes a first multilayer ceramic structure including a plurality of laminated first dielectric layers, a plurality of first inner electrodes, and a plurality of second inner electrodes; a second multilayer ceramic structure including a plurality of laminated second dielectric layers, a plurality of third inner electrodes, and a plurality of fourth inner electrodes; an intermediate body between the first multilayer ceramic structure and the second multilayer ceramic structure in the laminating direction and not including the inner electrodes; a first connection electrode on a first end surface side of a center position of the first multilayer ceramic structure in the length direction and electrically connecting the plurality of first inner electrodes; a second connection electrode on a second end surface side of the center position of the first multilayer ceramic structure in the length direction and electrically connecting the plurality of second inner electrodes; a third connection electrode on a second end surface side of the center position of the second multilayer ceramic structure in the length direction and electrically connecting the plurality of third inner electrodes; a fourth connection electrode on a first end surface side of the center position of the second multilayer ceramic structure in the length direction and electrically connecting the plurality of fourth inner electrodes; a first connection wire electrically connecting the first connection electrode and the third connection electrode; and a second connection wire electrically connecting the second connection electrode and the fourth connection electrode. One of the first multilayer ceramic structure and the second multilayer ceramic structure includes the outer electrode and the inner electrodes not connected via the first connection wire and the second connection wire, and another one of the first multilayer ceramic structure and the second multilayer ceramic structure includes the outer electrode and the inner electrodes electrically connected via the first connection wire and the second connection wire. A distance from the first connection electrode to a center position of the first multilayer ceramic structure in the length direction and a distance from the third connection electrode to a center position of the second multilayer ceramic structure in the length direction are equal or substantially equal to each other. A distance from the second connection electrode to the center position of the first multilayer ceramic structure in the length direction and a distance from the fourth connection electrode to the center position of the second multilayer ceramic structure in the length direction are equal or substantially equal to each other.

With the multilayer ceramic capacitor according to the first preferred embodiment of the present invention, a current route from the first connection electrode via the first connection wire to one connection electrode and a current route from the second connection electrode via the second connection wire to the other connection electrode have different lengths. Therefore, when voltage is applied to the outer electrode, it is possible to shift the timing of expansion and contraction of the first multilayer ceramic structure and the timing of expansion and contraction of the second multilayer ceramic structure to inhibit deformation occurring to the multilayer ceramic capacitor and inhibit "acoustic noise".

Also, with the multilayer ceramic capacitor according to the second preferred embodiment of the present invention, the first connection electrode is positioned on the first end surface side of the first multilayer ceramic structure, the second connection electrode is positioned on the second end surface side of the first multilayer ceramic structure, the third connection electrode is positioned on the second end surface side of the second multilayer ceramic structure, and the fourth connection electrode is positioned on the first end surface side of the second multilayer ceramic structure. The distance from the first connection electrode to the center position of the first multilayer ceramic structure in the length direction and the distance from the third connection electrode to the center position of the second multilayer ceramic structure in the length direction are equal or substantially equal to each other, and the distance from the second connection electrode to the center position of the first multilayer ceramic structure in the length direction and the distance from the fourth connection electrode to the center position of the second multilayer ceramic structure in the length direction are equal or substantially equal to each other. That is, the second multilayer ceramic structure is in a positional relationship in which the first multilayer ceramic structure that is reversed with respect to the center line in the laminating direction and further reversed with respect to the center line in the length direction. Therefore, when voltage is applied to the outer electrode, the second multilayer ceramic structure is deformed in a direction in which deformation of the first multilayer ceramic structure is canceled. Thus, deformation occurring to the entire multilayer ceramic capacitor can be effectively reduced or prevented, and "acoustic noise" can be effectively reduced or prevented.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

In the following, preferred embodiments of the present invention and modifications thereof are described with reference to the drawings.

First Preferred Embodiment

Figure 1:
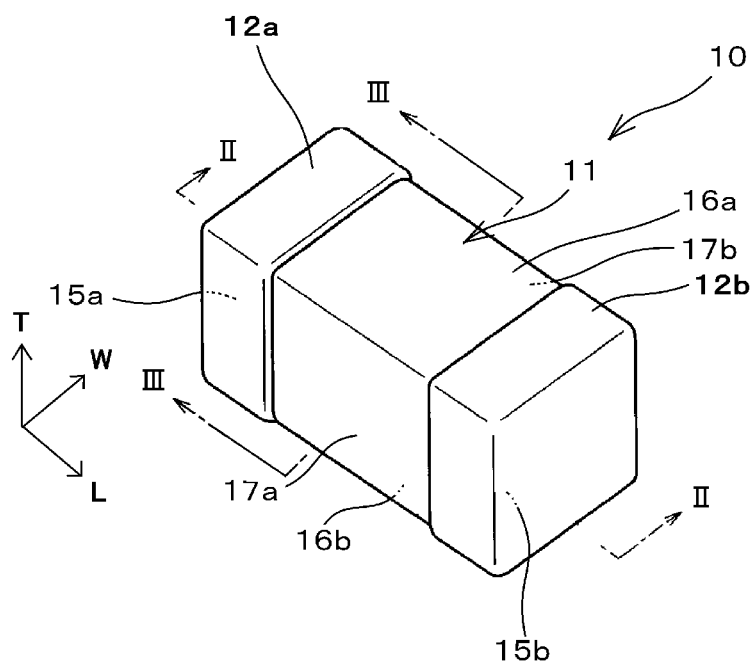
FIG. 1 is a schematic perspective view of a multilayer ceramic capacitor according to a first preferred embodiment of the present invention.
Figure 2:
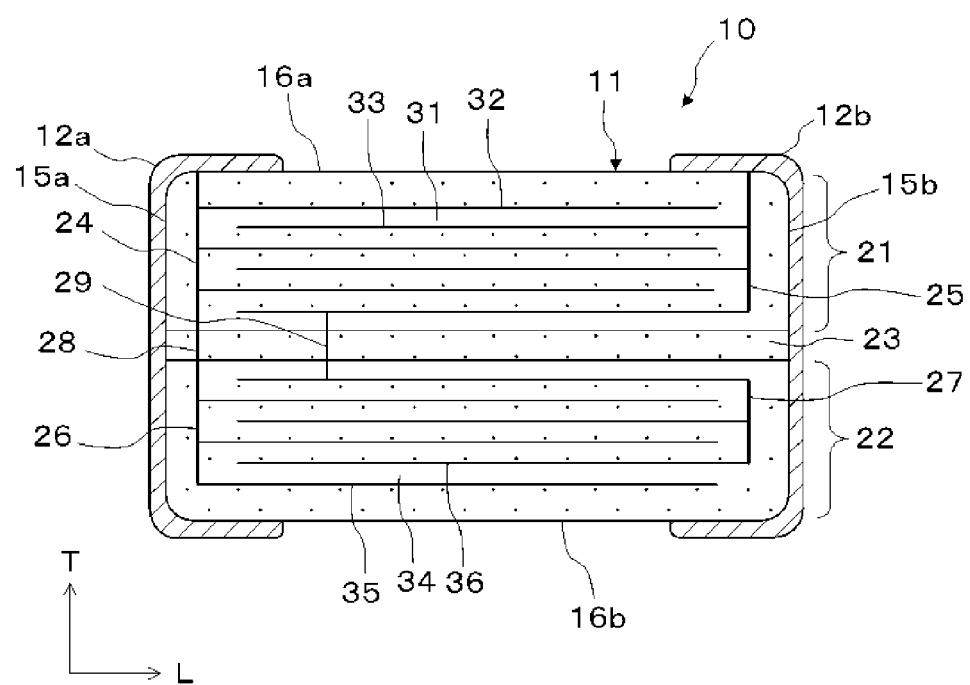
FIG. 2 is a schematic sectional view of the multilayer ceramic capacitor depicted in FIG. 1 along a II-II line.
Figure 3:
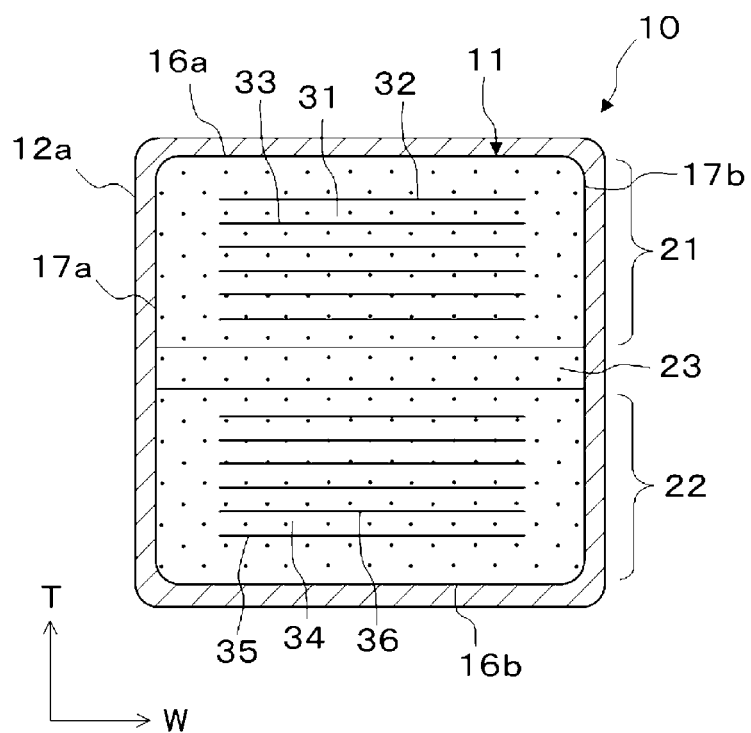
FIG. 3 is a schematic sectional view of the multilayer ceramic capacitor depicted in FIG. 1 along a line.

FIG. 1 is a schematic perspective view of a multilayer ceramic capacitor 10 according to a first preferred embodiment of the present invention. FIG. 2 is a schematic sectional view of the multilayer ceramic capacitor 10 depicted in FIG. 1 along a II-II line. FIG. 3 is a schematic sectional view of the multilayer ceramic capacitor 10 depicted in FIG. 1 along a III-III line.

As shown in FIG. 1 to FIG. 3, the multilayer ceramic capacitor 10 is an electronic component having a rectangular or substantially rectangular parallelepiped shape, and includes a multilayer body 11 and a pair of outer electrodes 12a and 12b. The pair of outer electrodes 12a and 12b are opposed to each other, as shown in FIG. 1.

Here, the direction in which the pair of outer electrodes 12a and 12b are opposed to each other is defined as a length direction L of the multilayer ceramic capacitor 10; the direction in which a first multilayer ceramic structure 21, an intermediate body 23, and a second multilayer ceramic structure 22, which are described further below, are laminated is defined as a laminating direction T; and a direction orthogonal or substantially orthogonal to both of the length direction L and the laminating direction T is defined as a width direction W. Among the length direction L, the laminating direction T, and the width direction W, any two directions are directions orthogonal or substantially orthogonal to each other.

The multilayer body 11 includes a first end surface 15a and a second end surface 15b opposed to each other in the length direction L, a first main surface 16a and a second main surface 16b opposed to each other in the laminating direction T, and a first side surface 17a and a second side surface 17b opposed to each other in the width direction W.

The multilayer body 11 includes corner portions and ridge portions that are preferably rounded. Here, each corner portion is a portion where three surfaces of the multilayer body 11 cross, and each ridge portion is a portion where two surfaces of the multilayer body 11 cross.

As shown in FIG. 2 and FIG. 3, the multilayer body 11 includes the first multilayer ceramic structure 21, the second multilayer ceramic structure 22, the intermediate body 23, a first connection electrode 24, a second connection electrode 25, a third connection electrode 26, a fourth connection electrode 27, a first connection wire 28, and a second connection wire 29.

The first multilayer ceramic structure 21 includes a plurality of laminated first dielectric layers 31, a plurality of first inner electrodes 32, and a plurality of second inner electrodes 33. In more detail, the first multilayer ceramic structure 21 includes the plurality of first inner electrodes 32 and the plurality of second inner electrodes 33 alternately laminated in the laminating direction T with the first dielectric layer 31 interposed therebetween, and defines and functions as a capacitor.

The first dielectric layer 31 is preferably made of a ceramic material including, for example, as a main component, $BaTiO_3$, $CaTiO_3$, $SrTiO_3$, $SrZrO_3$, $CaZrO_3$, or the like. To any of these main components, a sub-component such as a Mn compound, Fe compound, Cr compound, Co compound, or Ni compound, for example, having less content than that of the main component may be added.

The first inner electrode 32 is not extended to any of the first end surface 15a, the second end surface 15b, the first side surface 17a, and the second side surface 17b of the multilayer body 11. Also, the second inner electrode 33 does not extend to any of the first end surface 15a, the second end surface 15b, the first side surface 17a, and the second side surface 17b of the multilayer body 11.

The first inner electrode 32 and the second inner electrode 33 preferably include, for example, a metal such as Ni, Cu, Ag, Pd, Pt, Fe, Ti, Cr, Sn, or Au, an alloy including any of these metals, and so forth. The first inner electrode 32 and the second inner electrode 33 may include, as a common material, the same or substantially the same ceramic material as that of the dielectric ceramic included in the first dielectric layer 31. In this case, the ratio of the common material included in the first inner electrode 32 and the second inner electrode 33 is preferably, for example, 20 vol % or less.

The materials of all of the inner electrodes 32 and 33 are not required to be the same or substantially the same as each other, and may be different from each other. Also, each of the inner electrodes 32 and 33 may include portions made of different materials.

The second multilayer ceramic structure 22 includes a plurality of laminated second dielectric layer 34, a plurality of third inner electrodes 35, and a plurality of fourth inner electrodes 36. In more detail, the second multilayer ceramic structure 22 includes the plurality of third inner electrodes 35 and the plurality of fourth inner electrodes 36 alternately laminated in the laminating direction T with the second dielectric layer 34 interposed therebetween, and functions as a capacitor.

The ceramic material of the second dielectric layer 34 may be the same or substantially the same as or different from the ceramic material of the first dielectric layer 31. In the present preferred embodiment, the ceramic material of the second dielectric layer 34 is preferably the same or substantially the same as the ceramic material of the first dielectric layer 31.

The material of the third inner electrode 35 and the fourth inner electrode 36 may be the same or substantially the same as or different from the material of the first inner electrode 32 and the second inner electrode 33. In the present preferred embodiment, the material of the third inner electrode 35 and the fourth inner electrode 36 is the same or substantially the same as the material of the first inner electrode 32 and the second inner electrode 33.

The intermediate body 23 is between the first multilayer ceramic structure 21 and the second multilayer ceramic structure 22 in the laminating direction T, and does not include an inner electrode. In the present preferred embodiment, the first multilayer ceramic structure 21 is on a first main surface 16a side of the multilayer body 11, the second multilayer ceramic structure 22 is on a second main surface 16b side of the multilayer body 11, and the intermediate body 23 is interposed between the first multilayer ceramic structure 21 and the second multilayer ceramic structure 22.

The intermediate body 23 is preferably made of a ceramic material including, for example, as a main component, $BaTiO_3$, $CaTiO_3$, $SrTiO_3$, $SrZrO_3$, $CaZrO_3$, or the like. To any of these main components, a sub-component such as a Mn compound, Fe compound, Cr compound, Co compound, or Ni compound, for example, having less content than that of the main component may be added.

The ceramic material of the intermediate body 23 may be the same or substantially the same as or different from the ceramic material of the first dielectric layer 31 and the second dielectric layer 34. In the present preferred embodiment, the ceramic material of the intermediate body 23 is preferably the same or substantially the same as the ceramic material of the first dielectric layer 31 and the second dielectric layer 34.

The thickness of the intermediate body 23 in the laminating direction T is preferably thicker than the thickness of the first dielectric layer 31 and the second dielectric layer 34. With the thickness of the intermediate body 23 being thicker than the thickness of the first dielectric layer 31 and the second dielectric layer 34, the stiffness of the multilayer ceramic capacitor 10 is increased. Thus, when voltage is applied between the first outer electrode 12a and the second outer electrode 12b, deformation of the multilayer ceramic capacitor 10 can be reduced or prevented, thus reducing or preventing "acoustic noise" caused by deformation of the multilayer ceramic capacitor 10.

Here, if an inner electrode among the first inner electrodes 32 and the second inner electrodes 33 of the first multilayer ceramic structure 21 at a position closest to the intermediate body 23 and an inner electrode among the third inner electrodes 35 and the fourth inner electrodes 36 of the second multilayer ceramic structure 22 at a position closest to the intermediate body 23 have different polarities, a difference in voltage arises between these two inner electrodes when voltage is applied between the first outer electrode 12a and the second outer electrode 12b. In this case, the thickness of the intermediate body 23 needs to be sufficiently thick so that a structure with the intermediate body 23 interposed between the above-described two inner electrodes does not define and function as a capacitor.

On the other hand, if the above-described two inner electrodes have the same polarity, a difference in voltage does not arise between the above-described two inner electrodes, and the structure with the intermediate body 23 interposed between the above-described two inner electrodes does not define and function as a capacitor. Thus, the thickness of the intermediate body 23 can be relatively thin. In the multilayer ceramic capacitor 10 in the present preferred embodiment, the above-described two inner electrodes have the same polarity. Therefore, the thickness of the intermediate body 23 can be relatively thin, thus enabling a decrease in size of the multilayer ceramic capacitor 10 in the laminating direction T.

The first connection electrode 24 electrically connects the plurality of first inner electrodes 32 of the first multilayer ceramic structure 21. In the present preferred embodiment, the first connection electrode 24 is a via electrode provided inside the first multilayer ceramic structure 21, and is provided, as shown in FIG. 2, on a first end surface 15a side of the multilayer body 11.

The second connection electrode 25 electrically connects the plurality of second inner electrodes 33 of the first multilayer ceramic structure 21. In the present preferred embodiment, the second connection electrode 25 is a via electrode provided inside the first multilayer ceramic structure 21, and is provided, as shown in FIG. 2, on a second end surface 15b side of the multilayer body 11.

The third connection electrode 26 electrically connects the plurality of third inner electrodes 35 of the second multilayer ceramic structure 22. In the present preferred embodiment, the third connection electrode 26 is a via electrode provided inside the second multilayer ceramic structure 22, and is provided, as shown in FIG. 2, on a first end surface 15a side of the multilayer body 11.

The fourth connection electrode 27 electrically connects the plurality of fourth inner electrodes 36 of the second multilayer ceramic structure 22. In the present preferred embodiment, the fourth connection electrode 27 is a via electrode provided inside the second multilayer ceramic structure 22, and is provided, as shown in FIG. 2, on a second end surface 15b side of the multilayer body 11.

The first connection wire 28 electrically connects the first connection electrode 24 and one of the third connection electrode 26 and the fourth connection electrode 27. In the present preferred embodiment, the first connection wire 28 electrically connects the first connection electrode 24 and the third connection electrode 26. Specifically, as shown in FIG. 2, the first connection wire 28 connects the first connection electrode 24 and the third connection electrode 26 at the same or substantially the same position as those of the first connection electrode 24 and the third connection electrode 26 in the length direction L.

The second connection wire 29 electrically connects the second connection electrode 25 and another one of the third connection electrode 26 and the fourth connection electrode 27. In the present preferred embodiment, the second connection wire 29 electrically connects the second connection electrode 25 and the fourth connection electrode 27. Specifically, as shown in FIG. 2, the second connection wire 29 is a via provided between the center position of the multilayer body 11 in the length direction L and the first end surface 15a, and connects the second inner electrode 33 among the plurality of second inner electrodes 33 electrically connected to the second connection electrode 25 that is closest to the intermediate body 23 and the fourth inner electrode 36 among the plurality of fourth inner electrodes 36 electrically connected to the fourth connection electrode 27 that is closest to the intermediate body 23.

The first outer electrode 12a is provided on the first end surface 15a of the multilayer body 11. In the present preferred embodiment, the first outer electrode 12a is provided on the entire or substantially the entire first end surface 15a of the multilayer body 11, and extends from the first end surface 15a to the first main surface 16a, the second main surface 16b, the first side surface 17a, and the second side surface 17b.

The second outer electrode 12b is provided on the second end surface 15b of the multilayer body 11. In the present preferred embodiment, the second outer electrode 12b is provided on the entire or substantially the entire second end surface 15b of the multilayer body 11, and extends from the second end surface 15b to the first main surface 16a, the second main surface 16b, the first side surface 17a, and the second side surface 17b.

However, the positions where the first outer electrode 12a and the second outer electrode 12b are provided are not limited to those described above. For example, the first outer electrode 12a and the second outer electrode 12b may be provided only on the first main surface 16a of the multilayer body 11. Also, the first outer electrode 12a may be provided on the entire or substantially the entire first end surface 15a of the multilayer body 11 and extend from the first end surface 15a to the first main surface 16a and the second main surface 16b and the second outer electrode 12b may extend from the second end surface 15b to the first main surface 16a and the second main surface 16b of the multilayer body 11.

The first outer electrode 12a and the second outer electrode 12b each include, for example, an underlying electrode layer and a plated layer on the underlying electrode layer.

The underlying electrode layer preferably includes, for example, at least one of a baked electrode layer, a resin electrode layer, a thin-film electrode layer, and so forth as described below.

The baked electrode layer is a layer including glass and metal, and may include a single layer or a plurality of layers. The baked electrode layer preferably includes, for example, a metal such as Cu, Ni, Ag, Pd, Ti, Cr, or Au, an alloy including any of these metals, and so forth.

The baked electrode layer is formed by coating the multilayer body with conductive paste including glass and metal and baking the coated multilayer body.

The resin electrode layer may be, for example, a layer including conductive particles and thermosetting resin. When the resin electrode layer is provided, the resin electrode layer may be provided directly on a ceramic element assembly without providing a baked electrode layer. The resin electrode layer may include a single layer or a plurality of layers.

The thin-film electrode layer is preferably, for example, a layer equal to or less than about 1 μm and includes deposited metal particles, and can be formed by a known thin-film forming method such as sputtering or vapor deposition, for example.

The plated layer on the underlying electrode layer preferably includes, for example, at least one of metals such as Cu, Ni, Ag, Pd, and Au, an alloy of Ag and Pd, and so forth. The plated layer may include a single layer or a plurality of layers. However, the plated layer preferably has a two-layer structure including a Ni-plated layer and a Sn-plated layer. The Ni-plated layer prevents the underlying electrode layer from being eroded by soldering when the multilayer ceramic capacitor 10 is mounted. The Sn-plated layer improves solder wettability when the multilayer ceramic capacitor 10 is mounted.

The first outer electrode 12a and the second outer electrode 12b may not each include the underlying electrode layer and may be defined by a plated layer directly provided on the multilayer body 11.

As one example of size, the dimensions of the multilayer ceramic capacitor 10 in the length direction L, the width direction W, and the laminating direction T are respectively about 1.0 mm, about 0.5 mm, and about 0.5 mm; the thickness of the first dielectric layer 31 and the second dielectric layer 34 is about 1 μm; the thickness of the first inner electrode 32, the second inner electrode 33, the third inner electrode 35, and the fourth inner electrode 36 is about 1 μm; the thickness of the first outer electrode 12a and the second outer electrode 12b is about 50 μm; and the via diameter (diameter) of the first connection electrode 24, the second connection electrode 25, the third connection electrode 26, the fourth connection electrode 27, the first connection wire 28, and the second connection wire 29 is about 50 μm.

In one of the first multilayer ceramic structure 21 and the second multilayer ceramic structure 22, the outer electrode and the inner electrode are not directly connected to each other via the first connection wire 28 or the second connection wire 29. In the other multilayer ceramic structure, the outer electrode and the inner electrode are electrically connected to each other via the first connection wire 28 and the second connection wire 29.

To achieve the above-described structure, in the present preferred embodiment, the first connection electrode 24 is connected to the first outer electrode 12a on a first main surface 16a side of the multilayer body 11, and the second connection electrode 25 is connected to the second outer electrode 12b on a first main surface 16a side of the multilayer body 11. That is, the first inner electrodes 32 of the first multilayer ceramic structure 21 are directly connected to the first outer electrode 12a by the first connection electrode 24, and the second inner electrodes 33 are directly connected to the second outer electrode 12b by the second connection electrode 25.

The third inner electrodes 35 of the second multilayer ceramic structure 22 are electrically connected to the first outer electrode 12a via the third connection electrode 26, the first connection wire 28, and the first connection electrode 24. Also, the fourth inner electrodes 36 of the second multilayer ceramic structure 22 are electrically connected to the second outer electrode 12b via the fourth connection electrode 27, the second connection wire 29, and the second connection electrode 25.

However, the first connection electrode 24 may not be connected to the first outer electrode 12a, and at least one of the plurality of first inner electrodes 32 may extend to the first end surface 15a of the multilayer body 11 to be directly connected to the first outer electrode 12a. Similarly, the second connection electrode 25 may not be connected to the second outer electrode 12b, and at least one of the plurality of second inner electrodes 33 may extend to the second end surface 15b of the multilayer body 11 to be directly connected to the second outer electrode 12b.

That is, "the outer electrode and the inner electrode are not connected to each other via the first connection wire or the second connection wire" includes a structure in which the inner electrode extends to the position of the outer electrode for direct connection and a structure in which the inner electrode is directly connected to the outer electrode via another member (in the present preferred embodiment, the first connection electrode 24 or the second connection electrode 25).

Figure 4:
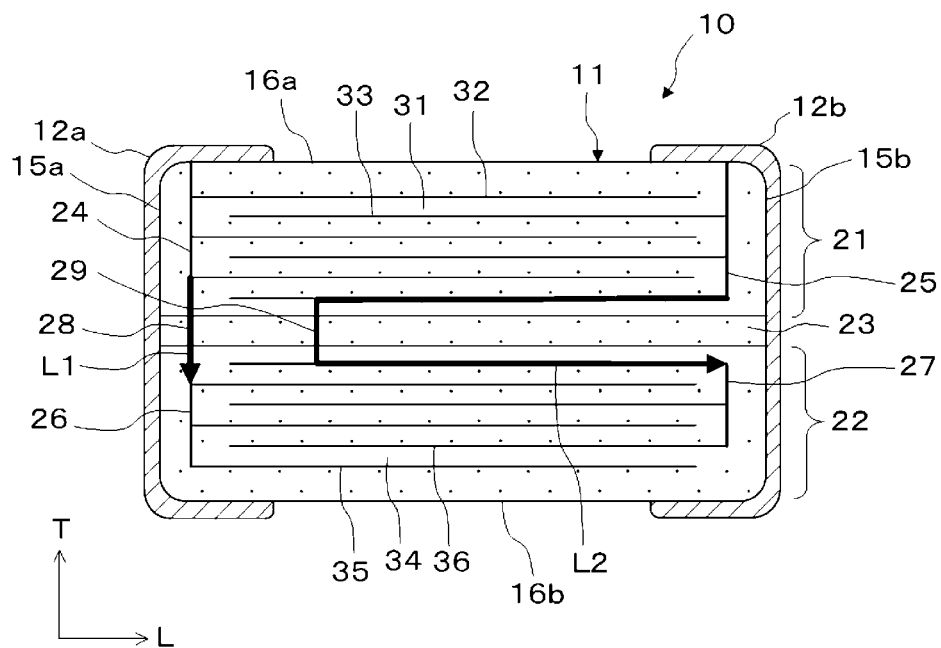
FIG. 4 is a diagram illustrating a current route from a first connection electrode via a first connection wire to a third connection electrode and a current route from a second connection electrode via a second connection wire to a fourth connection electrode when voltage is applied to an outer electrode.

In the multilayer ceramic capacitor 10 in the present preferred embodiment, as shown in FIG. 4, a current route L1 from the first connection electrode 24 via the first connection wire 28 to the third connection electrode 26 and a current route L2 from the second connection electrode 25 via the second connection wire 29 to the fourth connection electrode 27 have different lengths. That is, the current route L1 from the first connection electrode 24 provided on the first end surface 15a side via the first connection wire 28 provided on the first end surface 15a side to the third connection electrode 26 provided on the first end surface 15a side is shorter than the current route L2 from the second connection electrode 25 provided on the second end surface 15b side via the second connection wire 29 provided between the center position of the multilayer body 11 in the length direction L and the first end surface 15a to the fourth connection electrode 27 provided on the second end surface 15b side.

In this manner, the current route L1 from the first connection electrode 24 via the first connection wire 28 to the third connection electrode 26 and the current route L2 from the second connection electrode 25 via the second connection wire 29 to the fourth connection electrode 27 have different lengths. Thus, when voltage is applied between the first outer electrode 12a and the second outer electrode 12b, it is possible to shift the timing of expansion and contraction of the first multilayer ceramic structure 21 and the timing of expansion and contraction of the second multilayer ceramic structure 22. This reduces or prevents deformation occurring to the entire multilayer ceramic capacitor 10, and thus reduces or prevents "acoustic noise" caused by deformation of the multilayer ceramic capacitor 10.

Also, in the heretofore existing multilayer ceramic capacitor in which two or more capacitor portions are provided in the chip so as to be spaced apart in the length direction, the mount area increases as the dimension in the length direction increases. In contrast, the multilayer ceramic capacitor 10 in the present preferred embodiment is configured such that the first multilayer ceramic structure 21 and the second multilayer ceramic structure 22 are arranged in the laminating direction T. Thus, the mount area does not increase.

Second Preferred Embodiment

Figure 5:
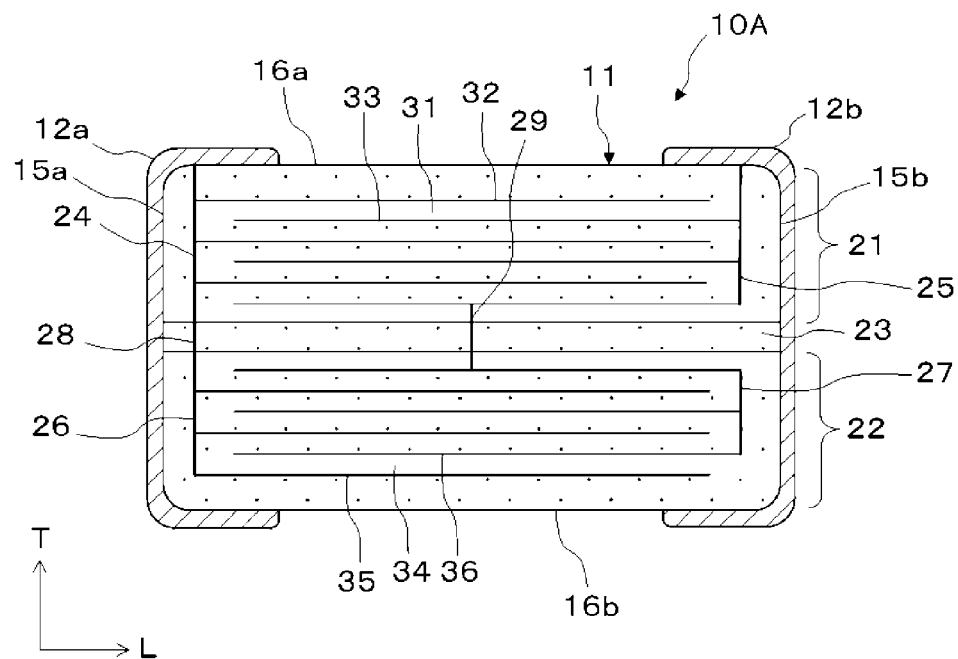
FIG. 5 is a schematic sectional view of a multilayer ceramic capacitor according to a second preferred embodiment of the present invention, the view corresponding to the sectional view depicted in FIG. 2.

FIG. 5 is a schematic sectional view of a multilayer ceramic capacitor 10A according to a second preferred embodiment of the present invention, the view corresponding to the sectional view shown in FIG. 2.

In the multilayer ceramic capacitor 10 according to the first preferred embodiment, the second connection wire 29 is provided, as shown in FIG. 2, between the center position of the multilayer body 11 in the length direction L and the first end surface 15a. In contrast, in the multilayer ceramic capacitor 10A according to the second preferred embodiment, the second connection wire 29 is provided, as shown in FIG. 5, at a center position or a substantially center position of the multilayer body 11 in the length direction L. The structure other than the position where the second connection wire 29 is provided is the same or substantially the same as that of the multilayer ceramic capacitor 10 according to the first preferred embodiment.

The center or substantially center position of the multilayer body 11 in the length direction L is preferably, for example, a position within a range of distance of about 5% of the dimension of the multilayer body 11 in the length direction L with respect to the center position of the multilayer body 11 in the length direction L.

Also in the multilayer ceramic capacitor 10A according to the second preferred embodiment, the current route from the first connection electrode 24 via the first connection wire 28 to the third connection electrode 26 and the current route from the second connection electrode 25 via the second connection wire 29 to the fourth connection electrode 27 have different lengths. That is, the current route from the first connection electrode 24 provided on the first end surface 15a side via the first connection wire 28 provided on the first end surface 15a side to the third connection electrode 26 provided on the first end surface 15a side is shorter than the current route from the second connection electrode 25 provided on the second end surface 15b side via the second connection wire 29 provided at the substantially center position of the multilayer body 11 in the length direction L to the fourth connection electrode 27 provided on the second end surface 15b side.

Therefore, as with the multilayer ceramic capacitor 10 according to the first preferred embodiment, in the multilayer ceramic capacitor 10A according to the second preferred embodiment, when voltage is applied between the first outer electrode 12a and the second outer electrode 12b, it is possible to shift the timing of expansion and contraction of the first multilayer ceramic structure 21 and the timing of expansion and contraction of the second multilayer ceramic structure 22. This reduces or prevents deformation occurring to the entire multilayer ceramic capacitor 10.

Here, in a heretofore existing multilayer ceramic capacitor, a portion deformed most by expansion and contraction when voltage is applied to a pair of outer electrodes is a center portion in the length direction. In the multilayer ceramic capacitor 10A in the present preferred embodiment, the second connection wire 29 is provided at the center position or the substantially center position of the multilayer body 11 in the length direction L. Thus, when voltage is applied between the first outer electrode 12a and qthe second outer electrode 12b, it is possible to more effectively reduce or prevent expansion and contraction occurring to the entire multilayer ceramic capacitor 10A. This more effectively reduces or prevents "acoustic noise" caused by deformation of the multilayer ceramic capacitor 10A.

Instead of the second connection wire 29, the first connection wire 28 may be provided at the center position or the substantially center position of the multilayer body 11 in the length direction L. That is, it is only required that at least one of the first connection wire 28 and the second connection wire 29 is provided at the center or the substantially center position of the multilayer body 11 in the length direction L.

Third Preferred Embodiment

Figure 6:
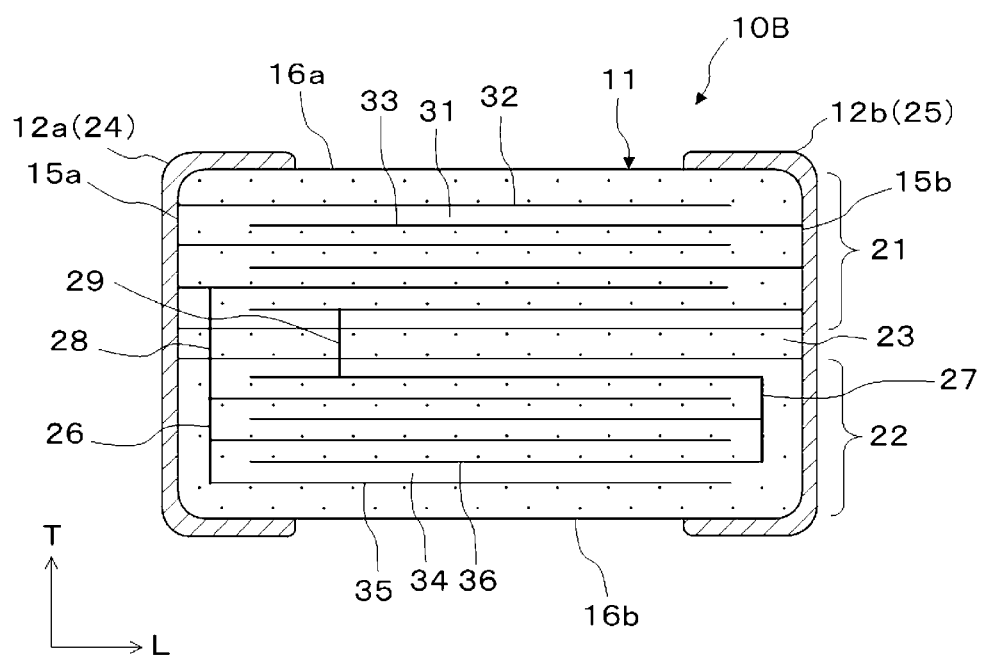
FIG. 6 is a schematic sectional view of a multilayer ceramic capacitor according to a third preferred embodiment of the present invention, the view corresponding to the sectional view depicted in FIG. 2.

FIG. 6 is a schematic sectional view of a multilayer ceramic capacitor 10B according to a third preferred embodiment of the present invention, the view corresponding to the sectional view depicted in FIG. 2.

In the multilayer ceramic capacitor 10 according to the first preferred embodiment and the multilayer ceramic capacitor 10A according to the second preferred embodiment, the first connection electrode 24 and the second connection electrode 25 are via electrodes provided inside the first multilayer ceramic structure 21.

In contrast, the multilayer ceramic capacitor 10B according to the third preferred embodiment is configured so that the first outer electrode 12a also defines and functions as the first connection electrode 24 and the second outer electrode 12b also defines and functions as the second connection electrode 25.

As shown in FIG. 6, all of the first inner electrodes 32 of the first multilayer ceramic structure 21 extend to the first end surface 15a and connected to the first outer electrode 12a. That is, all of the first inner electrodes 32 of the first multilayer ceramic structure 21 are mutually electrically connected via the first outer electrode 12a which also defines and functions as the first connection electrode 24.

Also, all of the second inner electrodes 33 of the first multilayer ceramic structure 21 extend to the second end surface 15b and connected to the second outer electrode 12b. That is, all of the second inner electrodes 33 of the first multilayer ceramic structure 21 are mutually electrically connected via the second outer electrode 12b which also defines and functions as the second connection electrode 25.

Also in the multilayer ceramic capacitor 10B according to the third preferred embodiment, as with the multilayer ceramic capacitor 10 according to the first preferred embodiment and the multilayer ceramic capacitor 10A according to the second preferred embodiment, when voltage is applied between the first outer electrode 12a and the second outer electrode 12b, it is possible to shift the timing of expansion and contraction of the first multilayer ceramic structure 21 and the timing of expansion and contraction of the second multilayer ceramic structure 22. This reduces or prevents deformation occurring to the entire multilayer ceramic capacitor 10B. This effectively reduces or prevents "acoustic noise" caused by deformation of the multilayer ceramic capacitor 10B.

Also, since the first outer electrode 12a also defines and functions as the first connection electrode 24 and the second outer electrode 12b also defines and functions as the second connection electrode 25, unlike the multilayer ceramic capacitor 10 according to the first preferred embodiment and the multilayer ceramic capacitor 10A according to the second preferred embodiment, it is not necessary to provide via electrodes as the first connection electrode 24 and the second connection electrode 25. Therefore, the manufacturing process can be simplified, and the cost of manufacturing the multilayer ceramic capacitor 10B can be decreased.

Modified Example of Third Preferred Embodiment

Figure 7:
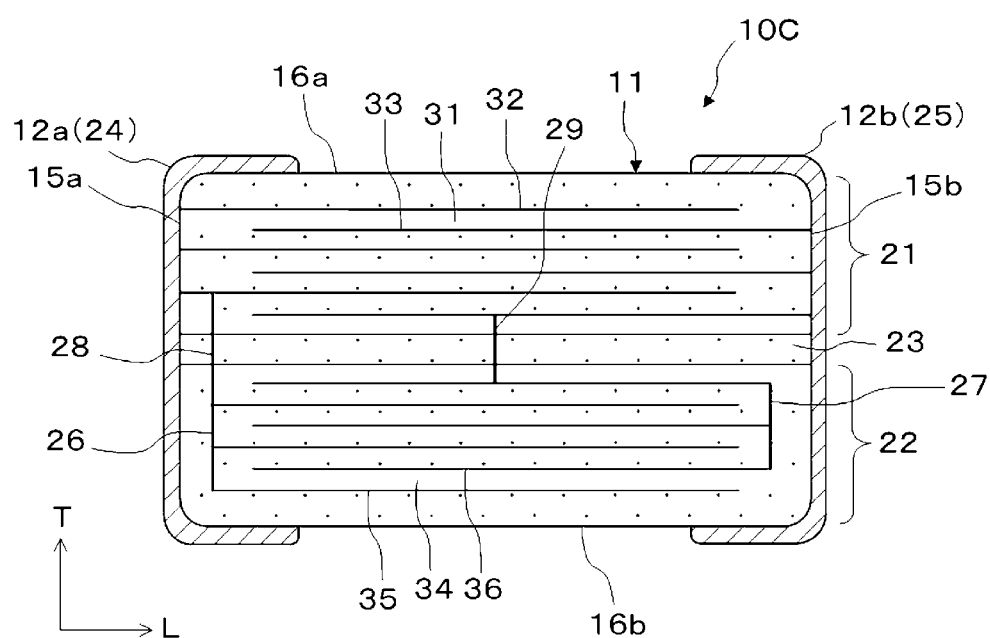
FIG. 7 is a schematic sectional view of a multilayer ceramic capacitor according to a modified example of the third preferred embodiment of the present invention, the view corresponding to the sectional view depicted in FIG. 2.

FIG. 7 is a schematic sectional view of a multilayer ceramic capacitor 10C according to a modified example of the third preferred embodiment, the view corresponding to the sectional view shown in FIG. 2.

The multilayer ceramic capacitor 10C shown in FIG. 7 is also configured so that, as with the multilayer ceramic capacitor 10B shown in FIG. 6, the first outer electrode 12a also defines and functions as the first connection electrode 24 and the second outer electrode 12b also defines and functions as the second connection electrode 25. Furthermore, as with the multilayer ceramic capacitor 10A according to the second preferred embodiment, the second connection wire 29 is provided at the center position or the substantially center position of the multilayer body 11 in the length direction L. Instead of the second connection wire 29, the first connection wire 28 may be provided at the center or the substantially center position of the multilayer body 11 in the length direction L.

According to this multilayer ceramic capacitor 10C, advantageous effects similar to the advantageous effects achieved by the multilayer ceramic capacitor 10A according to the second preferred embodiment and the multilayer ceramic capacitor 10B according to the third preferred embodiment are achieved.

Fourth Preferred Embodiment

Figure 8:
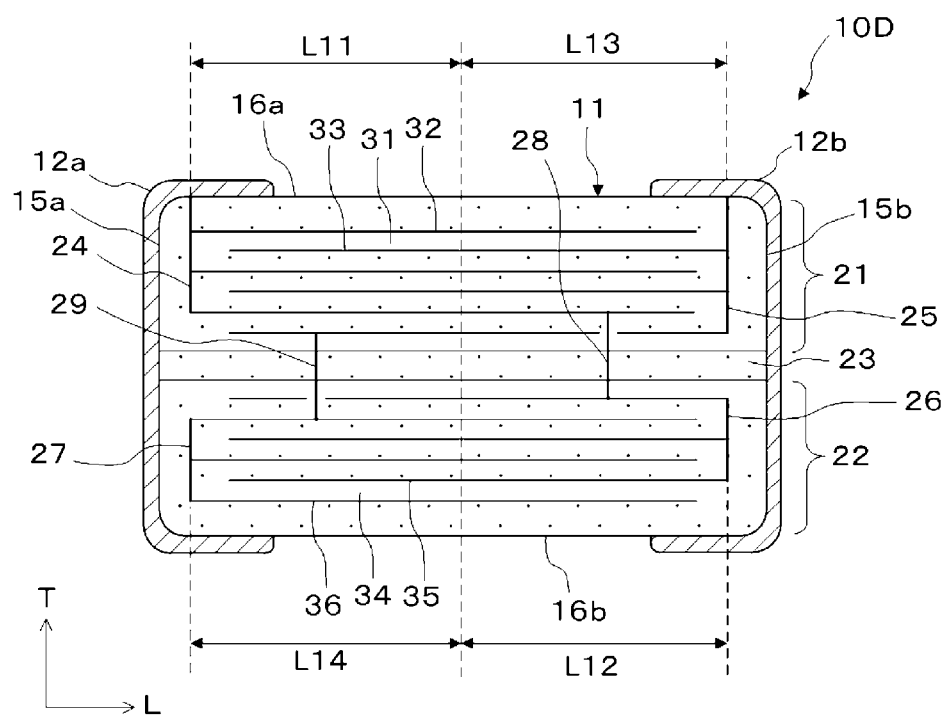
FIG. 8 is a schematic sectional view of a multilayer ceramic capacitor according to a fourth preferred embodiment of the present invention, the view corresponding to the sectional view depicted in FIG. 2.

FIG. 8 is a schematic sectional view of a multilayer ceramic capacitor 10D according to a fourth preferred embodiment of the present invention, the view corresponding to the sectional view shown in FIG. 2.

The first connection electrode 24 is positioned on a first end surface 15a side of the center position of the first multilayer ceramic structure 21 in the length direction L to electrically connect the plurality of first inner electrodes 32. In the present preferred embodiment, the first connection electrode 24 connects end portions of the plurality of first inner electrodes 32 on a first end surface 15a side.

The second connection electrode 25 is positioned on a second end surface 15b side of the center position of the first multilayer ceramic structure 21 in the length direction L to electrically connect the plurality of second inner electrodes 33. In the present preferred embodiment, the second connection electrode 25 connects end portions of the plurality of second inner electrodes 33 on a second end surface 15b side.

The third connection electrode 26 is positioned on a second end surface 15b side of the center position of the second multilayer ceramic structure 22 in the length direction L to electrically connect the plurality of third inner electrodes 35. In the present preferred embodiment, the third connection electrode 26 connects end portions of the plurality of third inner electrodes 35 on a second end surface 15b side.

The fourth connection electrode 27 is positioned on a first end surface 15a side of the center position of the second multilayer ceramic structure 22 in the length direction L to electrically connect the plurality of fourth inner electrodes 36. In the present preferred embodiment, the fourth connection electrode 27 connects end portions of the plurality of fourth inner electrodes 36 on a first end surface 15a side.

While one of the first multilayer ceramic structure 21 and the second multilayer ceramic structure 22 includes the outer electrodes and the inner electrodes not connected via the first connection wire 28 and the second connection wire 29, the other multilayer ceramic structure includes the outer electrodes and the inner electrodes electrically connected via the first connection wire 28 and the second connection wire 29. To achieve the above-described structure, in the present preferred embodiment, the first connection electrode 24 is connected to the first outer electrode 12a on a first main surface 16a side of the multilayer body 11, and the second connection electrode 25 is connected to the second outer electrode 12b on a first main surface 16a side of the multilayer body 11. That is, the first inner electrodes 32 of the first multilayer ceramic structure 21 are directly connected to the first outer electrode 12a by the first connection electrode 24, and the second inner electrodes 33 are directly connected to the second outer electrode 12b by the second connection electrode 25.

The third inner electrodes 35 of the second multilayer ceramic structure 22 are electrically connected to the first outer electrode 12a via the third connection electrode 26, the first connection wire 28, and the first connection electrode 24. Also, the fourth inner electrodes 36 of the second multilayer ceramic structure 22 are electrically connected to the second outer electrode 12b via the fourth connection electrode 27, the second connection wire 29, and the second connection electrode 25.

The first connection wire 28 electrically connects the first connection electrode 24 and the third connection electrode 26 together. In the present preferred embodiment, the first connection wire 28 is connected to the first inner electrode 32 among the plurality of first inner electrodes 32 electrically connected to the first connection electrode 24 at a position closest to the intermediate body 23, and is also connected to the third inner electrode 35 among the plurality of third inner electrodes 35 electrically connected to the third connection electrode 26 at a position closest to the intermediate body 23, thus electrically connecting the first connection electrode 24 and the third connection electrode 26 together.

The second connection wire 29 electrically connects the second connection electrode 25 and the fourth connection electrode together. In the present preferred embodiment, the second connection wire 29 is connected to the second inner electrode 33 among the plurality of second inner electrodes 33 electrically connected to the second connection electrode 25 at a position closest to the intermediate body 23, and is also connected to the fourth inner electrode 36 among the plurality of fourth inner electrodes 36 electrically connected to the fourth connection electrode 27 at a position closest to the intermediate body 23.

In the multilayer ceramic capacitor 10D according to the present preferred embodiment, a distance L11 from the first connection electrode 24 to the center position of the first multilayer ceramic structure 21 in the length direction L and a distance L12 from the third connection electrode 26 to the center position of the second multilayer ceramic structure 22 in the length direction L are preferably equal or substantially equal to each other. Also, a distance L13 from the second connection electrode 25 to the center position of the first multilayer ceramic structure 21 in the length direction L and a distance L14 from the fourth connection electrode 27 to the center position of the second multilayer ceramic structure 22 in the length direction L are preferably equal or substantially equal to each other.

That is, in the multilayer ceramic capacitor 10D according to the present preferred embodiment, the second multilayer ceramic structure 22 is in a positional relationship in which the first multilayer ceramic structure 21 is reversed with respect to the center line in the laminating direction T and further reversed with respect to the center line in the length direction L. Therefore, when voltage is applied to the first outer electrode 12a and the second outer electrode 12b, the second multilayer ceramic structure 22 is deformed in a direction in which deformation of the first multilayer ceramic structure 21 is canceled. Thus, deformation occurring to the entire multilayer ceramic capacitor 10D is effectively reduced or prevented. This effectively reduces or prevents "acoustic noise" caused by deformation of the multilayer ceramic capacitor 10D.

Modified Example of Fourth Preferred Embodiment

Figure 9:
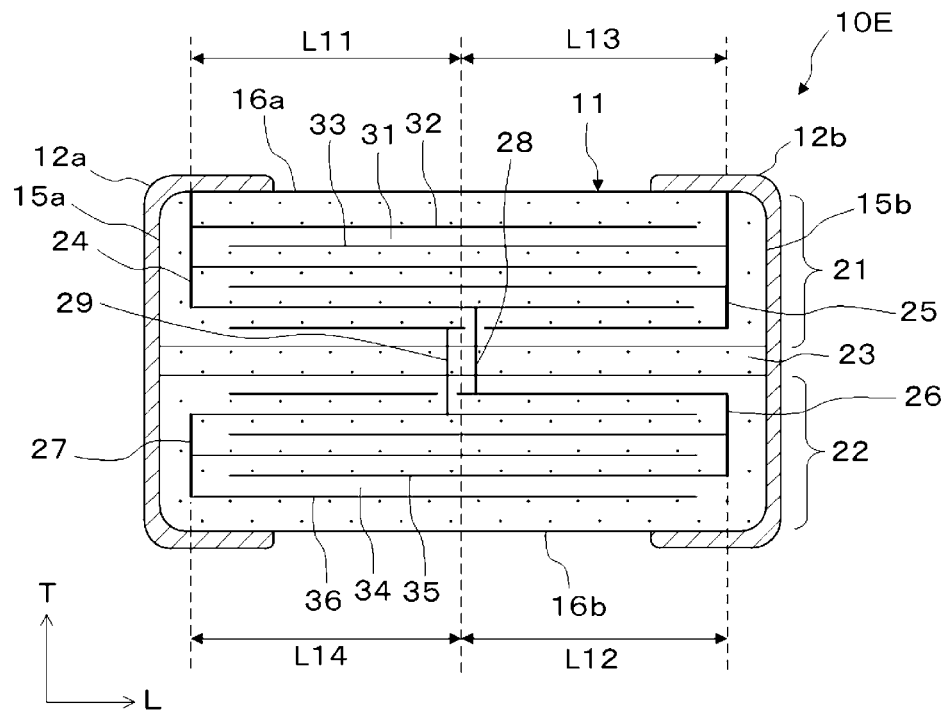
FIG. 9 is a schematic sectional view of a multilayer ceramic capacitor according to a modified example of the fourth preferred embodiment of the present invention, the view corresponding to the sectional view depicted in FIG. 2.

FIG. 9 is a schematic sectional view of a multilayer ceramic capacitor 10E according to a modified example of the fourth preferred embodiment, the view corresponding to the sectional view shown in FIG. 2.

In a multilayer ceramic capacitor 10E depicted in FIG. 9, the first connection wire 28 and the second connection wire 29 in the structure of the multilayer ceramic capacitor 10D shown in FIG. 8 are provided at a center or a substantially center position of the multilayer body 11 in the length direction L. Therefore, according to the multilayer ceramic capacitor 10E shown in FIG. 9, advantageous effects similar to the advantageous effects achieved by the multilayer ceramic capacitor 10D according to the fourth preferred embodiment and the multilayer ceramic capacitor 10A according to the second preferred embodiment are achieved.

Fifth Preferred Embodiment

In the multilayer ceramic capacitor 10 according to the first preferred embodiment, the current route from the first connection electrode 24 via the first connection wire 28 to the third connection electrode 26 and the current route from the second connection electrode 25 via the second connection wire 29 to the fourth connection electrode 27 have different lengths. Thus, the multilayer ceramic capacitor 10 is configured so that, when voltage is applied between the first outer electrode 12a and the second outer electrode 12b, the timing of expansion and contraction of the first multilayer ceramic structure 21 and the timing of expansion and contraction of the second multilayer ceramic structure 22 are shifted, thus reducing or preventing deformation occurring to the entire multilayer ceramic capacitor 10.

In a multilayer ceramic capacitor 10F according to the fifth preferred embodiment, to shift the timing of expansion and contraction of the first multilayer ceramic structure 21 and the timing of expansion and contraction of the second multilayer ceramic structure 22, one of the first connection wire 28 and the second connection wire 29 includes an orthogonal wire portion extending in a direction orthogonal or substantially orthogonal to the inner electrodes and a parallel wire portion extending in a direction parallel or substantially parallel to the inner electrodes.

Figure 10:
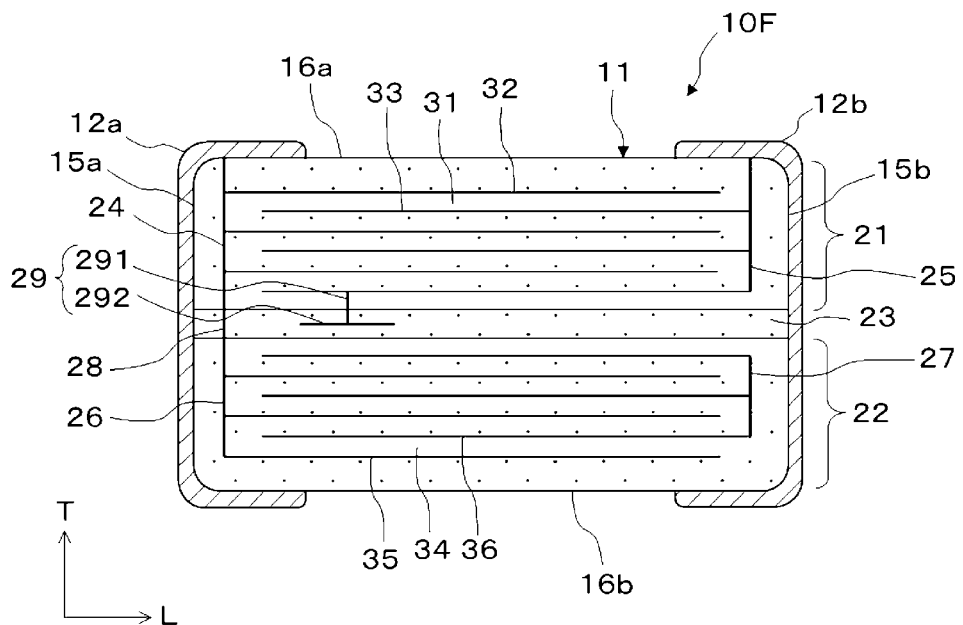
FIG. 10 is a schematic sectional view of a multilayer ceramic capacitor according to a fifth preferred embodiment of the present invention, the view corresponding to the sectional view depicted in FIG. 2.

FIG. 10 is a schematic sectional view of a multilayer ceramic capacitor 10F according to the fifth preferred embodiment, the view corresponding to the sectional view shown in FIG. 2. Also, FIG. 11 is a plan view of a parallel wire portion 292 of the second connection wire 29 described further below when viewed from the laminating direction T.

In the present preferred embodiment, of the first connection wire 28 and the second connection wire 29, the second connection wire 29 includes an orthogonal wire portion 291 extending in a direction orthogonal or substantially orthogonal to the inner electrodes 32, 33, 35, and 36 and the parallel wire portion 292 extending in a direction parallel to the inner electrodes 32, 33, 35, and 36. The orthogonal wire portion 291 includes a portion electrically connecting the second inner electrode 33 and the parallel wire portion 292 and a portion electrically connecting the parallel wire portion 292 and the fourth inner electrode 36. The orthogonal wire portion 291 is preferably, for example, a via.

In the multilayer ceramic capacitor 10F according to the fifth preferred embodiment, the structure other than the second connection wire 29 is the same or substantially the same as the structure of the multilayer ceramic capacitor 10 according to the first preferred embodiment depicted in FIG. 2. Also, instead of the second connection wire 29, the first connection wire 28 may include an orthogonal wire portion and a parallel wire portion.

Figure 11:
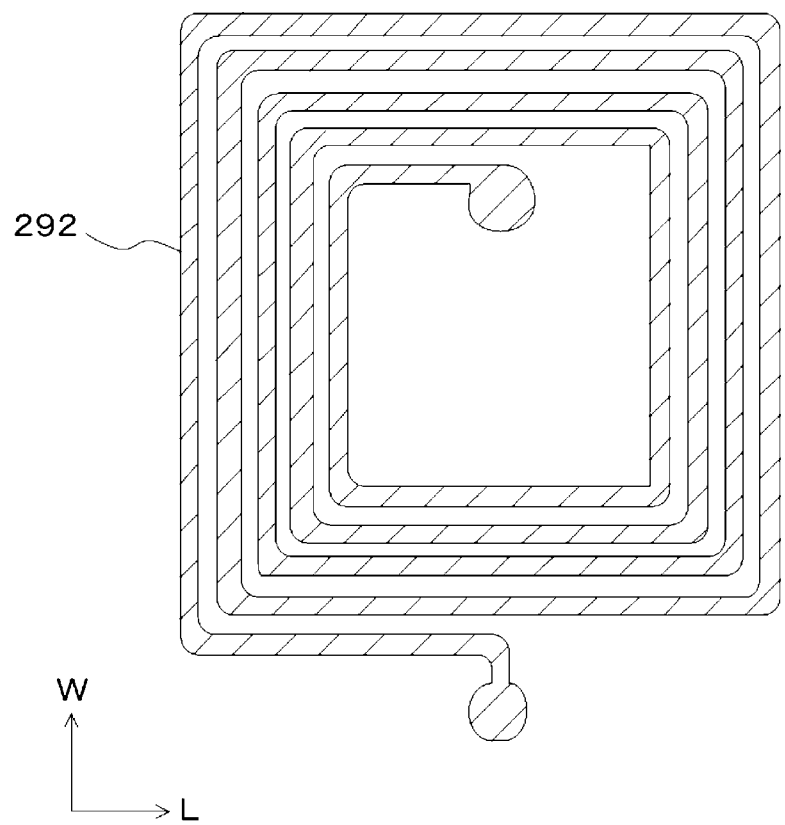
FIG. 11 is a plan view of a parallel wire portion of a second connection wire of the multilayer ceramic capacitor according to the fifth preferred embodiment when viewed from a laminating direction.

In the present preferred embodiment, the parallel wire portion 292 preferably has a substantially coil shape, as shown in FIG. 11. One end of the parallel wire portion 292 is connected to a portion of the orthogonal wire portion 291 electrically connecting the second inner electrode 33 and the parallel wire portion 292 together, and the other end thereof is connected to a portion thereof electrically connecting the parallel wire portion 292 and the fourth inner electrode 36 together. Since the one end and the other end of the parallel wire portion 292 are at different positions in the width direction W, the portion of the orthogonal wire portion 291 electrically connecting the parallel wire portion 292 and the fourth inner electrode 36 together is not shown in FIG. 10.

If the wire length of the second connection wire 29 can be increased, the shape of the parallel wire portion 292 is not limited to the substantially coil shape but can be any suitable shape.

In the multilayer ceramic capacitor 10F according to the fifth preferred embodiment, one of the first connection wire 28 and the second connection wire 29 includes not only the orthogonal wire portion extending to the direction orthogonal or substantially orthogonal to the inner electrodes but also the parallel wire portion extending to the direction parallel or substantially parallel to the inner electrodes. Thus, a difference between the wire length of the first connection wire 28 and the wire length of the second connection wire 29 can be increased. Therefore, when voltage is applied to the first outer electrode 12a and the second outer electrode 12b, it is possible to effectively shift the timing of expansion and contraction of the first multilayer ceramic structure 21 and the timing of expansion and contraction of the second multilayer ceramic structure 22. This effectively reduces or prevents deformation occurring to the entire multilayer ceramic capacitor 10F and effectively reduces or prevents "acoustic noise" caused by deformation of the multilayer ceramic capacitor 10F.

First Modified Example of Fifth Preferred Embodiment

Figure 12:
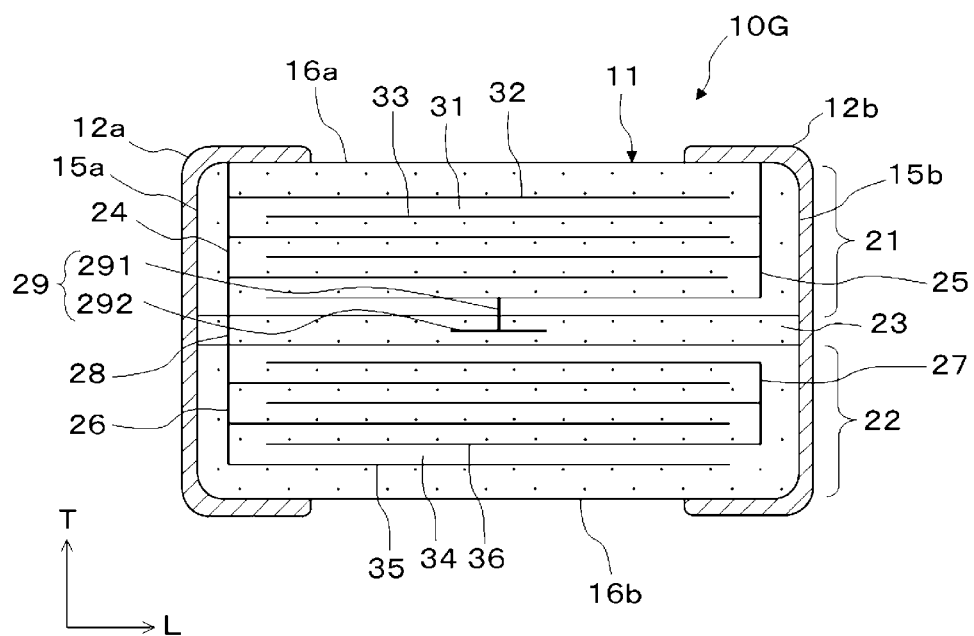
FIG. 12 is a schematic sectional view of a multilayer ceramic capacitor according to a first modified example of the fifth preferred embodiment of the present invention, the view corresponding to the sectional view depicted in FIG. 2.

FIG. 12 is a schematic sectional view of a multilayer ceramic capacitor 10G according to a first modified example of the fifth preferred embodiment, the view corresponding to the sectional view shown in FIG. 2.

In the multilayer ceramic capacitor 10G shown in FIG. 12, the second connection wire 29 is provided at a center position or a substantially center position of the multilayer body 11 in the length direction L in the structure of the multilayer ceramic capacitor 10F shown in FIG. 10. Therefore, according to the multilayer ceramic capacitor 10G depicted in FIG. 12, advantageous effects similar to the advantageous effects achieved by the multilayer ceramic capacitor 10F according to the fifth preferred embodiment and the multilayer ceramic capacitor 10A according to the second preferred embodiment are achieved.

Second Modified Example of Fifth Preferred Embodiment

Figure 13:
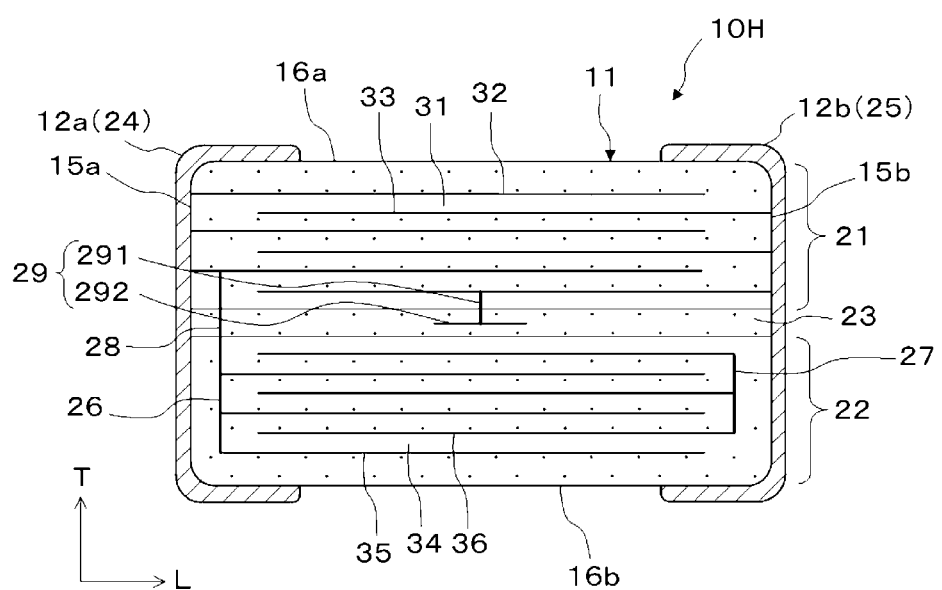
FIG. 13 is a schematic sectional view of a multilayer ceramic capacitor in a second modified example of the fifth preferred embodiment of the present invention, the view corresponding to the sectional view depicted in FIG. 2.

FIG. 13 is a schematic sectional view of a multilayer ceramic capacitor 10H according to a second modified example of the fifth preferred embodiment, the view corresponding to the sectional view shown in FIG. 2.

The multilayer ceramic capacitor 10H shown in FIG. 13 is configured so that the first outer electrode 12a also defines and functions as the first connection electrode 24 and the second outer electrode 12b also defines and functions as the second connection electrode 25 in the structure of the multilayer ceramic capacitor 10F depicted in FIG. 10. Therefore, according to the multilayer ceramic capacitor 10H shown in FIG. 13, advantageous effects similar to the advantageous effects achieved by the multilayer ceramic capacitor 10F according to the fifth preferred embodiment and the multilayer ceramic capacitor 10B according to the third preferred embodiment are achieved.

Multilayer Ceramic Capacitor Manufacturing Method

Of the multilayer ceramic capacitors in the above-described preferred embodiments and their modified examples, one non-limiting example of a method of manufacturing the multilayer ceramic capacitor 10 according to the first preferred embodiment is described below.

First, ceramic green sheets, inner electrode conductive paste, and outer electrode conductive paste are prepared. As the ceramic green sheets, known ceramic green sheets can be used, and can be acquired by, for example, coating a base material with ceramic slurry including ceramic powder, resin components, and a solvent and drying it.

The ceramic slurry preferably includes, for example, $CaTi$, $ZrO_3$, $SrZrO_3$, $BaTiO_3$, $BaTi$, $CaO_3$, or the like. The ceramic slurry may further include resin components defining and functioning as a disperser or binder. The solid content in the ceramic slurry preferably has a concentration, for example, equal to or more than about 10 vol % and equal to or less than about 27 vol %, and the pigment volume concentration (PVC) of ceramic powder in the solid content is preferably, for example, equal to or more than about 65% and equal to or less than about 95%.

Next, the ceramic green sheet is coated with the inner electrode conductive paste to form an inner electrode pattern. Coating with the inner electrode conductive paste can be performed by any printing method, for example, screen printing, intaglio printing, relief printing, or inkjet printing. Intaglio printing and relief printing may be performed by offset printing. Also, the inner electrode pattern may be formed, for example, by printing a plurality of times with the same printing method or different printing methods.

The inner electrode conductive paste preferably includes, for example, particles made of metal such as Ni, Cu, Ag, Pd, Pt, Fe, Ti, Cr, Sn, or Au or a precursor thereof and a solvent.

The inner electrode conductive paste may further include resin components defining and functioning as a disperser or binder.

The inner electrode conductive paste preferably has a viscosity, for example, equal to or more than about 5 mPa·s and equal to or less than about 50 Pa·s. The solid content in the inner electrode conductive paste preferably has a concentration, for example, equal to or more than about 9 vol % and equal to or less than about 20.5 vol %, and the pigment volume concentration (PVC) of the metal particles in the solid content is preferably, for example, equal to or more than about 70% and equal to or less than about 95%. Also, the metal particles preferably have a particle diameter, for example, equal to or more than about 10 nm and equal to or less than about 500 nm.

Next, a predetermined number of a plurality of ceramic green sheets on which no inner electrode pattern is formed are laminated, ceramic green sheets on which inner electrode patterns are formed are sequentially laminated on the resultant sheets, and a predetermined number of a plurality of ceramic green sheets on which no inner electrode pattern is formed are laminated on the resultant sheets, thus fabricating a multilayer body defining and functioning as the first multilayer ceramic structure 21 after firing. Furthermore, with a similar method, a multilayer body defining and functioning as the second multilayer ceramic structure 22 after firing is fabricated. Furthermore, with ceramic green sheets on which no inner electrode pattern is formed are laminated, thus fabricating a multilayer body serving as the intermediate body 23 after firing. When these multilayer bodies are fabricated, via holes for configuring the first connection electrode 24, the second connection electrode 25, the third connection electrode 26, the fourth connection electrode 27, the first connection wire 28, and the second connection wire 29 are formed, and the via holes are filled with conductive paste. As the conductive paste, for example, the same or substantially the same conductive paste as the inner electrode conductive paste can be used.

Next, the multilayer body defining and functioning as the first multilayer ceramic structure 21 after firing, the multilayer body defining and functioning as the intermediate body 23 after firing, and then the multilayer body defining and functioning as the second multilayer ceramic structure 22 after firing are sequentially laminated and then pressed to the laminating direction, thus fabricating a mother multilayer body. The temperature at the time of pressing is preferably, for example, about 25° C. or more and about 200° C. or less, and the pressure is preferably, for example, about 1 MPa or more and about 200 MPa or less.

Next, the mother multilayer body is cut by a cutting method such as, for example, cutting by pushing, cutting with a dicing machine, or by laser, into a predetermined size to acquire a multilayer chip.

Next, both end surfaces, a portion of both main surfaces, and a portion of both side surfaces of the multilayer chip are coated with the outer electrode conductive paste. The outer electrode conductive paste preferably includes, for example, particles made of metal or a precursor thereof and a solvent. The outer electrode conductive paste may further include resin components defining and functioning as a disperser or binder. The solid content in the outer electrode conductive paste preferably has a concentration, for example, equal to or more than about 9 vol % and equal to or less than about 20.5 vol %, and the pigment volume concentration (PVC) of the metal particles in the solid content is preferably, for example, equal to or more than about 70% and equal to or less than about 95%.

Next, the multilayer chip is fired. The firing temperature is preferably, for example, about 900° C. or more and about 1300° C. or less, depending on the ceramic material and the conductive paste materials being used. With this, the multilayer body and a metal layer of the outer electrode are formed.

The multilayer chip after fired may be coated with the outer electrode conductive paste and then fired.

Then, a plated layer is formed as required on the surface of the metal layer. Formation of the plated layer is preferably performed by first forming a Ni-plated layer and then forming a Sn-plated layer, for example.

With the above-described processes, the multilayer ceramic capacitor 10 can be manufactured.

The present invention is not limited to the above-described preferred embodiments, and various applications and modifications can be applied in the scope of the present invention. For example, characteristic structures in each of the above-described preferred embodiments and their modified examples can be combined as appropriate.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic capacitor comprising:
    a multilayer body including a plurality of laminated dielectric layers and a plurality of inner electrodes and including a first main surface and a second main surface opposed to each other in a laminating direction of the dielectric layers and the inner electrodes, a first side surface and a second side surface opposed to each other in a width direction orthogonal or substantially orthogonal to the laminating direction, and a first end surface and a second end surface opposed to each other in a length direction orthogonal or substantially orthogonal to the laminating direction and the width direction; and
    an outer electrode electrically connected to the plurality of inner electrodes and provided on a surface of the multilayer body; wherein
    the multilayer body includes:
        a first multilayer ceramic structure including a plurality of laminated first dielectric layers, a plurality of first inner electrodes, and a plurality of second inner electrodes;
        a second multilayer ceramic structure including a plurality of laminated second dielectric layers, a plurality of third inner electrodes, and a plurality of fourth inner electrodes;
        an intermediate body between the first multilayer ceramic structure and the second multilayer ceramic structure in the laminating direction and not including the plurality of inner electrodes;
        a first connection electrode electrically connecting the plurality of first inner electrodes;
        a second connection electrode electrically connecting the plurality of second inner electrodes;
        a third connection electrode electrically connecting the plurality of third inner electrodes;
        a fourth connection electrode electrically connecting the plurality of fourth inner electrodes;
        a first connection wire electrically connecting the first connection electrode and one of the third connection electrode and the fourth connection electrode; and
        a second connection wire electrically connecting the second connection electrode and another one of the third connection electrode and the fourth connection electrode;
    one of the first multilayer ceramic structure and the second multilayer ceramic structure includes the outer electrode and the plurality of inner electrodes not connected via the first connection wire and the second connection wire, and another one of the first multilayer ceramic structure and the second multilayer ceramic structure includes the outer electrode and the plurality of inner electrodes electrically connected via the first connection wire and the second connection wire; and
    a current route from the first connection electrode via the first connection wire to the one of the third connection electrode and the fourth connection electrode and a current route from the second connection electrode via the second connection wire to the another one of the third connection electrode and the fourth connection electrode have different lengths.

2. The multilayer ceramic capacitor according to claim 1, wherein one of the first connection wire and the second connection wire includes an orthogonal wire portion extending in a direction orthogonal or substantially orthogonal to the plurality inner electrodes and a parallel wire portion extending in a direction parallel or substantially parallel to the plurality of inner electrodes.

3. The multilayer ceramic capacitor according to claim 1, wherein at least one of the first connection wire and the second connection wire is provided at a center or a substantially center of the multilayer body in the length direction.

4. The multilayer ceramic capacitor according to claim 1, wherein
    the outer electrode includes a first outer electrode provided on the first end surface side of the surface of the multilayer body and a second outer electrode provided on the second end surface side thereof; and
    the multilayer ceramic capacitor is configured so that the first outer electrode defines and functions as the first connection electrode and the second outer electrode defines and functions as the second connection electrode.

5. The multilayer ceramic capacitor according to claim 1, wherein an inner electrode among the plurality of first inner electrodes and the plurality of second inner electrodes that is closest to the intermediate body and an inner electrode among the plurality of third inner electrodes and the plurality of fourth inner electrodes that is closest to the intermediate body have a same polarity.

6. The multilayer ceramic capacitor according to claim 1, wherein each of the plurality of laminated dielectric layers includes $BaTiO_3$, $CaTiO_3$, $SrTiO_3$, $SrZrO_3$, or $CaZrO_3$ as a main component.

7. The multilayer ceramic capacitor according to claim 6, wherein each of the plurality of laminated dielectric layers includes a Mn compound, Fe compound, Cr compound, Co compound, or Ni compound as a sub-component.

8. The multilayer ceramic capacitor according to claim 1, wherein each of the plurality of inner electrodes includes Ni, Cu, Ag, Pd, Pt, Fe, Ti, Cr, Sn, or Au, an alloy including any of Ni, Cu, Ag, Pd, Pt, Fe, Ti, Cr, Sn, or Au.

9. The multilayer ceramic capacitor according to claim 1, wherein a thickness of the intermediate body is greater than a thickness of each of the plurality of laminated first dielectric layers the plurality of laminated second dielectric layers.

10. The multilayer ceramic capacitor according to claim 1, wherein the outer electrode includes an underlying electrode layer and a plated layer on the underlying electrode layer.

11. A multilayer ceramic capacitor comprising:
a multilayer body including a plurality of laminated dielectric layers and a plurality of inner electrodes and including a first main surface and a second main surface opposed to each other in a laminating direction of the dielectric layers and the inner electrodes, a first side surface and a second side surface opposed to each other in a width direction orthogonal or substantially orthogonal to the laminating direction, and a first end surface and a second end surface opposed to each other in a length direction orthogonal or substantially orthogonal to the laminating direction and the width direction; and
an outer electrode electrically connected to the plurality of inner electrodes and provided on a surface of the multilayer body; wherein
the multilayer body includes:
a first multilayer ceramic structure including a plurality of laminated first dielectric layers, a plurality of first inner electrodes, and a plurality of second inner electrodes;
a second multilayer ceramic structure including a plurality of laminated second dielectric layers, a plurality of third inner electrodes, and a plurality of fourth inner electrodes;
an intermediate body between the first multilayer ceramic structure and the second multilayer ceramic structure in the laminating direction and not including the plurality of inner electrodes;
a first connection electrode on a first end surface side of a center position of the first multilayer ceramic structure in the length direction and electrically connecting the plurality of first inner electrodes;
a second connection electrode on a second end surface side of the center position of the first multilayer ceramic structure in the length direction and electrically connecting the plurality of second inner electrodes;
a third connection electrode on a second end surface side of the center position of the second multilayer ceramic structure in the length direction and electrically connecting the plurality of third inner electrodes;
a fourth connection electrode on a first end surface side of the center position of the second multilayer ceramic structure in the length direction and electrically connecting the plurality of fourth inner electrodes;
a first connection wire electrically connecting the first connection electrode and the third connection electrode; and
a second connection wire electrically connecting the second connection electrode and the fourth connection electrode;
one of the first multilayer ceramic structure and the second multilayer ceramic structure includes the outer electrode and the plurality of inner electrodes not connected via the first connection wire and the second connection wire, and another one of the first multilayer ceramic structure and the second multilayer ceramic structure includes the outer electrode and the plurality of inner electrodes electrically connected via the first connection wire and the second connection wire;
a distance from the first connection electrode to a center position of the first multilayer ceramic structure in the length direction and a distance from the third connection electrode to a center position of the second multilayer ceramic structure in the length direction are equal or substantially equal to each other; and
a distance from the second connection electrode to the center position of the first multilayer ceramic structure in the length direction and a distance from the fourth connection electrode to the center position of the second multilayer ceramic structure in the length direction are equal or substantially equal to each other.

12. The multilayer ceramic capacitor according to claim 11, wherein at least one of the first connection wire and the second connection wire is provided at a center or a substantially center of the multilayer body in the length direction.

13. The multilayer ceramic capacitor according to claim 11, wherein
the outer electrode includes a first outer electrode provided on the first end surface side of the surface of the multilayer body and a second outer electrode provided on the second end surface side thereof; and
the first outer electrode defines and functions as the first connection electrode and the second outer electrode defines and functions as the second connection electrode.

14. The multilayer ceramic capacitor according to claim 11, wherein an inner electrode among the plurality of first inner electrodes and the plurality of second inner electrodes that is closest to the intermediate body and an inner electrode among the plurality of third inner electrodes and the plurality of fourth inner electrodes that is closest to the intermediate body have a same polarity.

15. The multilayer ceramic capacitor according to claim 11, wherein each of the plurality of laminated dielectric layers includes $BaTiO_3$, $CaTiO_3$, $SrTiO_3$, $SrZrO_3$, or $CaZrO_3$ as a main component.

16. The multilayer ceramic capacitor according to claim 15, wherein each of the plurality of laminated dielectric layers includes a Mn compound, Fe compound, Cr compound, Co compound, or Ni compound as a sub-component.

17. The multilayer ceramic capacitor according to claim 11, wherein each of the plurality of inner electrodes includes Ni, Cu, Ag, Pd, Pt, Fe, Ti, Cr, Sn, or Au, an alloy including any of Ni, Cu, Ag, Pd, Pt, Fe, Ti, Cr, Sn, or Au.

18. The multilayer ceramic capacitor according to claim 11, wherein a thickness of the intermediate body is greater than a thickness of each of the plurality of laminated first dielectric layers the plurality of laminated second dielectric layers.

19. The multilayer ceramic capacitor according to claim 11, wherein the outer electrode includes an underlying electrode layer and a plated layer on the underlying electrode layer.

* * * * *